(12) United States Patent
Zhou (10) Patent No.: US 11,727,663 B2
(45) Date of Patent: Aug. 15, 2023

(54) METHOD AND APPARATUS FOR DETECTING FACE KEY POINT, COMPUTER DEVICE AND STORAGE MEDIUM

(71) Applicant: BIGO TECHNOLOGY PTE. LTD., Singapore (SG)

(72) Inventor: Wei Zhou, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 183 days.

(21) Appl. No.: 17/293,402

(22) PCT Filed: Sep. 19, 2019

(86) PCT No.: PCT/CN2019/106587
§ 371 (c)(1),
(2) Date: May 12, 2021

(87) PCT Pub. No.: WO2020/098374
PCT Pub. Date: May 22, 2020

(65) Prior Publication Data
US 2022/0051000 A1 Feb. 17, 2022

(30) Foreign Application Priority Data
Nov. 13, 2018 (CN) .......................... 201811347185.8

(51) Int. Cl.
*G06V 40/16* (2022.01)
*G06V 10/24* (2022.01)
(Continued)

(52) U.S. Cl.
CPC .......... *G06V 10/242* (2022.01); *G06V 10/764* (2022.01); *G06V 10/82* (2022.01);
(Continued)

(58) Field of Classification Search
CPC .... G06V 10/242; G06V 10/764; G06V 10/82; G06V 40/165; G06V 40/168; G06V 40/172; G06V 40/161; G06F 18/00
See application file for complete search history.

(56) References Cited

U.S. PATENT DOCUMENTS 8,428,313 B2 *  4/2013  Yang ................... G06V 40/165
                                                      382/103
9,881,203 B2 *  1/2018  Hayasaka ................. G06T 3/60
(Continued)

FOREIGN PATENT DOCUMENTS

CN         1831846 A      9/2006
CN       101377814 A      3/2009
(Continued)

OTHER PUBLICATIONS

International Search Report of the International Searching Authority for China National Intellectual Property Administration in PCT application No. PCT/CN2019/106587 dated Dec. 19, 2019, which is an international application corresponding to this U.S. application. The State Intellectual Property Office of People's Republic of China, First Office Action in Patent Application No. CN201811347185.8 dated Jun. 9, 2020, which is a foreign counterpart application corresponding to this U.S. Patent Application, to which this application claims priority.

(Continued)

*Primary Examiner* — Phuoc Tran
(74) *Attorney, Agent, or Firm* — Kolitch Romano Dascenzo Gates LLC (57) ABSTRACT

A method for detecting a face key point includes: acquiring image data containing a face; detecting a first face key point of the face in the image data; identifying a face type of the face according to the first face key point; performing position correction on the first face key point with reference to the face type; extracting a facial features image containing facial features from the image data based on the first face key point subjected to the position correction; and detecting a second face key point of the face in the facial features image.

16 Claims, 6 Drawing Sheets

(51) Int. Cl.
  *G06V 10/764* (2022.01)
  *G06V 10/82* (2022.01)
(52) U.S. Cl.
  CPC .......... *G06V 40/165* (2022.01); *G06V 40/168* (2022.01); *G06V 40/172* (2022.01)

(56) References Cited

U.S. PATENT DOCUMENTS

| | | | |
|---|---|---|---|
| 11,182,589 B2* | 11/2021 | Xu | G06T 7/62 |
| 2009/0060290 A1 | 3/2009 | Sabe et al. | |
| 2009/0310829 A1 | 12/2009 | Baba et al. | |
| 2015/0347822 A1 | 12/2015 | Zhou et al. | |
| 2017/0180362 A1 | 6/2017 | Du | |
| 2018/0007259 A1 | 1/2018 | Wang et al. | |
| 2018/0089533 A1 | 3/2018 | Zagaynov et al. | |
| 2019/0138791 A1 | 5/2019 | Wang et al. | |
| 2019/0318152 A1* | 10/2019 | Aoi | G06V 40/171 |
| 2019/0318158 A1 | 10/2019 | Qin et al. | |

FOREIGN PATENT DOCUMENTS

| | | |
|---|---|---|
| CN | 101968846 A | 2/2011 |
| CN | 103605965 A | 2/2014 |
| CN | 104091148 A | 10/2014 |
| CN | 104091149 A | 10/2014 |
| CN | 104268591 A | 1/2015 |
| CN | 104361316 A | 2/2015 |
| CN | 105320954 A | 2/2016 |
| CN | 106339680 A | 1/2017 |
| CN | 106682598 A | 5/2017 |
| CN | 107066983 A | 8/2017 |
| CN | 107545220 A | 1/2018 |
| CN | 107545252 A | 1/2018 |
| CN | 107958444 A | 4/2018 |
| CN | 108460345 A | 8/2018 |
| CN | 108764048 A | 11/2018 |
| CN | 109376684 A | 2/2019 |
| RU | 2647670 C1 | 3/2018 |
| WO | 2018028546 A1 | 2/2018 |

OTHER PUBLICATIONS

The State Intellectual Property Office of People's Republic of China, Second Office Action in Patent Application No. CN201811347185.8 dated Sep. 7, 2020, which is a foreign counterpart application corresponding to this U.S. Patent Application, to which this application claims priority.

The State Intellectual Property Office of People's Republic of China, Third Office Action in Patent Application No. CN201811347185.8 dated Nov. 30, 2020, which is a foreign counterpart application corresponding to this U.S. Patent Application, to which this application claims priority.

Notification to Grant Patent Right for Invention of Chinese Application No. 201811347185.8 dated Mar. 10, 2021.

Gonzales-Jimenez, Daniel, et al.; "Pose Correction and Subject-Specific Features for Face Authentication", 8th International Conference on Pattern Recognition, Sep. 18, 2006.

Ma, Yan; "2D and 3D Face Recognition Technology"; Aug. 31, 2007.

Extended European Search Report, International Search Report and Written Opinion of the International Searching Authority, dated Dec. 2, 2021, in counterpart EP application No. 19883857.5, which is an international application corresponding to this U.S. application.

Communication pursuant to Article 94(3) EPC of counterpart EP application No. 19883857.5 dated Dec. 14, 2021.

Grant Decision of Russian Application No. 2021116083 dated Oct. 26, 2021.

Deng, Jiankang, et al.; "M3CSR: Multi-view, multi-scale and multi-component cascade shape regression", Image and Vision Computing, Elsevier, Guildford, GB, vol. 47, pp. 19-26, abstract, figure 2, Algorithm 1 and section 3; Dec. 15, 2015.

Deng, Jiankang, et al.; "Joint Multi-view Face Alignment in the Wild"; arxiv.org, Cornell University Library, Journal of Latex Class Files, vol. 4, No. 5; figure 5 and section III. A; Aug. 20, 2017.

Search Report of the Intellectual Property Office of Singapore for Application No. 11202104992R dated Mar. 22, 2023.

* cited by examiner

METHOD AND APPARATUS FOR DETECTING FACE KEY POINT, COMPUTER DEVICE AND STORAGE MEDIUM

CROSS-REFERENCE TO RELATED APPLICATION

This application is a US national stage of international application No. PCT/CN2019/106587, filed on Sep. 19, 2019, which claims priority to Chinese Patent Application No. 201811347185.8, filed with the China National Intellectual Property Administration (CNIPA) on Nov. 13, 2018. Both applications are incorporated herein by reference in their entireties.

TECHNICAL FIELD

Embodiments of the present disclosure relate to biometric processing technologies, and for example, relate to a method and apparatus for detecting a face key point, a computer device and a storage medium.

BACKGROUND

For applications such as live streaming and short videos that focus on user interaction, it is often necessary to detect face key points and locate face key points such as face contours and facial features contours, for face beauty, sticker effects at facial features, face deformation and face changing.

In order to improve the user experience, such as making the beauty finer and the sticker effects at facial features more stable, it is necessary to detect the face key points accurately enough. At the same time, in order to ensure real-time detection of the face key points in computer devices having scarce resources such as mobile terminals, it is necessary to detect the key points quickly enough.

Solutions for improving the accuracy in detecting the face key points are mainly divided into the following two categories:

1. Introducing a larger network model for a more detailed global feature expression of a face so as to obtain more accurate face key points.

2. Introducing a more hierarchical network model, i.e., multiple cascaded network models from rough to fine, to constantly mine global and local detail features of the face and to constantly correct locations of locating points.

SUMMARY

According to an embodiment of the present disclosure, a method for detecting a face key point is provided. The method includes:

acquiring image data containing a face;

detecting a first face key point of the face in the image data;

identifying a face type of the face according to the first face key point;

performing position correction on the first face key point with reference to the face type;

extracting a facial features image containing facial features from the image data based on the first face key point subjected to the position correction; and detecting a second face key point of the face in the facial features image.

According to an embodiment of the present disclosure, an apparatus for detecting a face key point is provided. The apparatus includes:

an image data acquiring module configured to acquire image data containing a face;

a first face key point detecting module configured to detect a first face key point of the face in the image data;

a face type identifying module configured to identify a face type of the face according to the first face key point;

a position correcting module configured to perform position correction on the first face key point with reference to the face type;

a facial features image extracting module configured to extract a facial features image containing facial features from the image data based on the first face key point subjected to the position correction; and a second face key point detecting module configured to detect a second face key point of the face in the facial features image.

According to an embodiment of the present disclosure, a computer device is further provided. The computer device includes a memory, a processor and a computer program stored on the memory and operable on the processor, wherein the processor, when executing the computer program, implements the method for detecting the face key point as provided by any embodiment of the present disclosure.

According to an embodiment of the present disclosure, a computer-readable storage medium storing a computer program is further provided. The computer program, when executed by a processor, causes the processor to implement the method for detecting the face key point as provided by any embodiment of the present disclosure.

DETAILED DESCRIPTION

The present disclosure will be described with reference to the accompanying drawings and embodiments. The specific embodiments described herein merely serve to explain but not to limit the present disclosure. For ease of description, only some but not all structures relevant to the present disclosure are shown in the drawings.

Based on descriptions on the background, it is known that the network model and the hierarchical model are simplex and emphasize on one aspect. In order to deal with different faces, the network model and the hierarchical model are large in size, resulting in a large amount of computation, high time complexity, and much demand on resources, which makes it difficult to apply to computer devices having scarce resources such as mobile terminals. According to embodiments of the present disclosure, a method and apparatus for detecting a face key point, a computer device and a storage medium are provided to ensure real-time detection of the face key point in computer devices having scarce resources, such as mobile terminals, while ensuring the accuracy in detecting the face key point.

Figure 1:
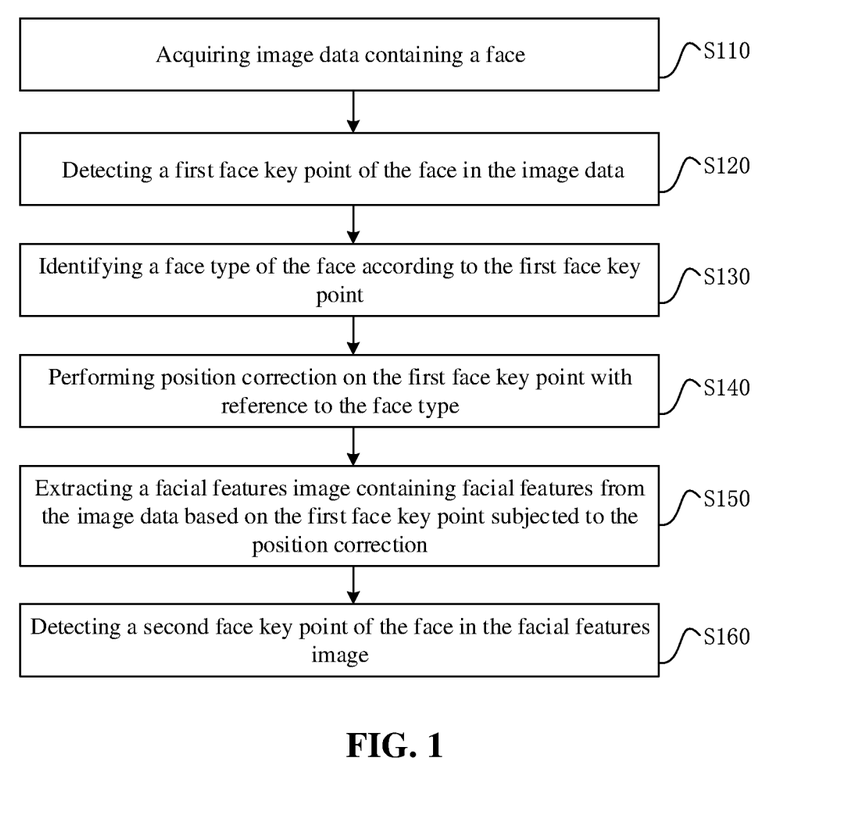
FIG. 1 is a flow chart of a method for detecting a face key point according to an embodiment of the present disclosure.

Referring to FIG. 1, a flow chart of a method for detecting a face key point according to embodiment 1 of the present disclosure is shown. This embodiment is applicable to scenarios in which the face key point is detected in real time in applications focusing on user interaction, such as live streaming and short videos. The method may be implemented by an apparatus for detecting a face key point, which may be implemented by software and/or hardware and may be configured in a computer device having scarce resources. The computer device may be a mobile terminal, such as a mobile phone, a tablet computer and a wearable device (e.g., a smart phone and smart glasses), and the computer device may also be a non-mobile terminal, such as a smart TV. The method includes S110 to S160.

In S110, image data containing a face is acquired.

In practice, in video scenarios such as live streaming and short videos, a currently played video frame image may be continuously extracted from video data while the video data is playing, so as to identify the image data containing the face.

In other scenarios, such as performing a beauty process after taking a photo, a user may also directly input one frame of image data containing the face. A data source of the image data containing the face will not be limited in the embodiments of the present disclosure.

The face may refer to a facial portion. In the same frame of image data, there may be one or more than one faces, and the area of the face may be all or part of the facial portion, etc. Neither the number nor the range of the face is limited in the embodiments of the present disclosure.

For the computer device, a face/non-face classifier may be added to detect whether the current image data has a face. If yes, follow-up operations will be performed, and if no, other image data will continue to be detected until the image data containing the face is detected.

In S120, a first face key point of the face is detected in the image data.

For the image data, the face may be roughly positioned, and the first face key point may be roughly positioned in the image data.

The first face key point may not be particularly accurate for describing each key point, but it is relatively accurate for describing the position of the whole face in the image data.

In S130, a face type of the face is identified according to the first face key point.

By applying the present embodiment, the face may be divided into different face types in advance according to orientations of the face, such as a left cheek (the face faces right, and the left cheek is exposed more), a frontal face (the face faces front, and the left cheek and the right cheek are exposed almost the same), a right cheek (the face faces left, and the right cheek is exposed more), etc.

For the image data, the orientations of the face may be identified from the first face key point of the face so as to determine the face type.

In S140, position correction is performed on the first face key point with reference to the face type.

The faces of different face types have different characteristics. Therefore, position correction may be performed on the first face key point according to the characteristics of the different face types to make the first face key point closer to the face.

In S150, a facial features image containing facial features is extracted from the image data based on a first face key point subjected to the position correction (based on a first face key point after a position correction).

After position correction is performed on the first face key point, division may be performed according to the facial features, and facial features images containing the facial features, such as eyes, eyebrows, nose and mouth, may be extracted from the image data.

In some embodiments, due to the different orientations of the face, the number of the detectable facial features may be one or more than one, and the areas of the facial features may be all or part of the facial features, etc. Neither the number nor the areas of the facial features are limited in the embodiments of the present disclosure.

In S160, a second face key point of the face is detected in the facial features image.

For the facial features image, fine positioning may be performed on the facial features, and the second face key point may be finely positioned in the facial features image.

In the embodiments of the present disclosure, for the image data containing the face, the first face key point of the face is detected in the image data, the face type of the face is identified according to the first face key point, position correction is performed on the first face key point with reference to the face type, the facial features image containing the facial features is extracted from the image data based on the first face key point subjected to the position correction, and the second face key point of the face is detected in the facial features image. By distinguishing the face types, the first key points of the different face types are corrected using different branch classifications, which simplifies the positioning operation, reduces the calculation amount, and ensures real-time detection of the face key point in the computer device having scarce resources such as mobile terminals while improves the accuracy in locating the face key point.

Figure 2:
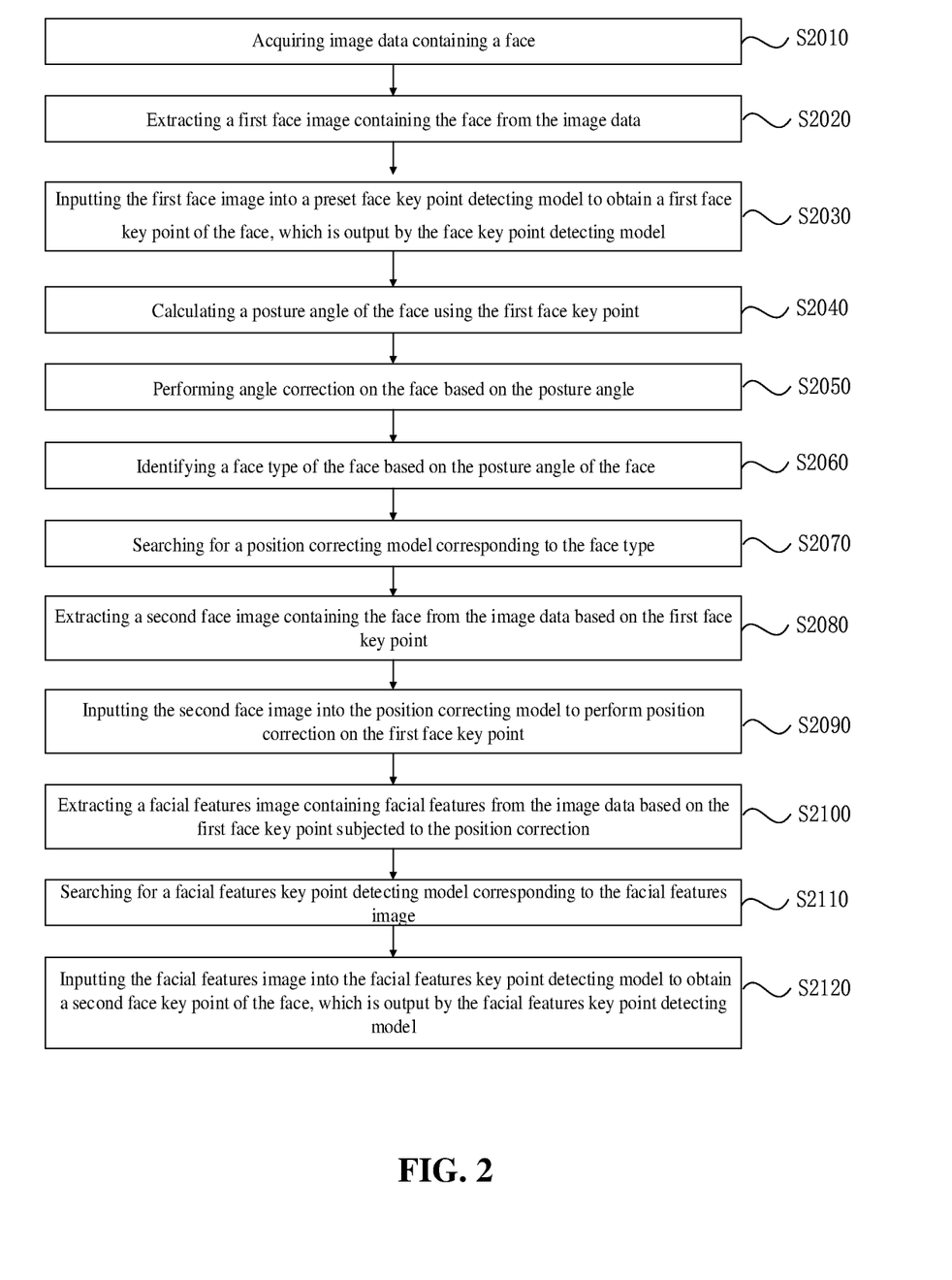
FIG. 2 is a flow chart of another method for detecting a face key point according to an embodiment of the present disclosure.

Referring to FIG. 2, a flow chart of another method for detecting a face key point according to embodiment 2 of the present disclosure is shown. In this embodiment, processing operations of a three-level network are added based on the foregoing embodiment. The method includes S2010 to S2120.

In S2010, image data containing a face is acquired.

Figure 3:
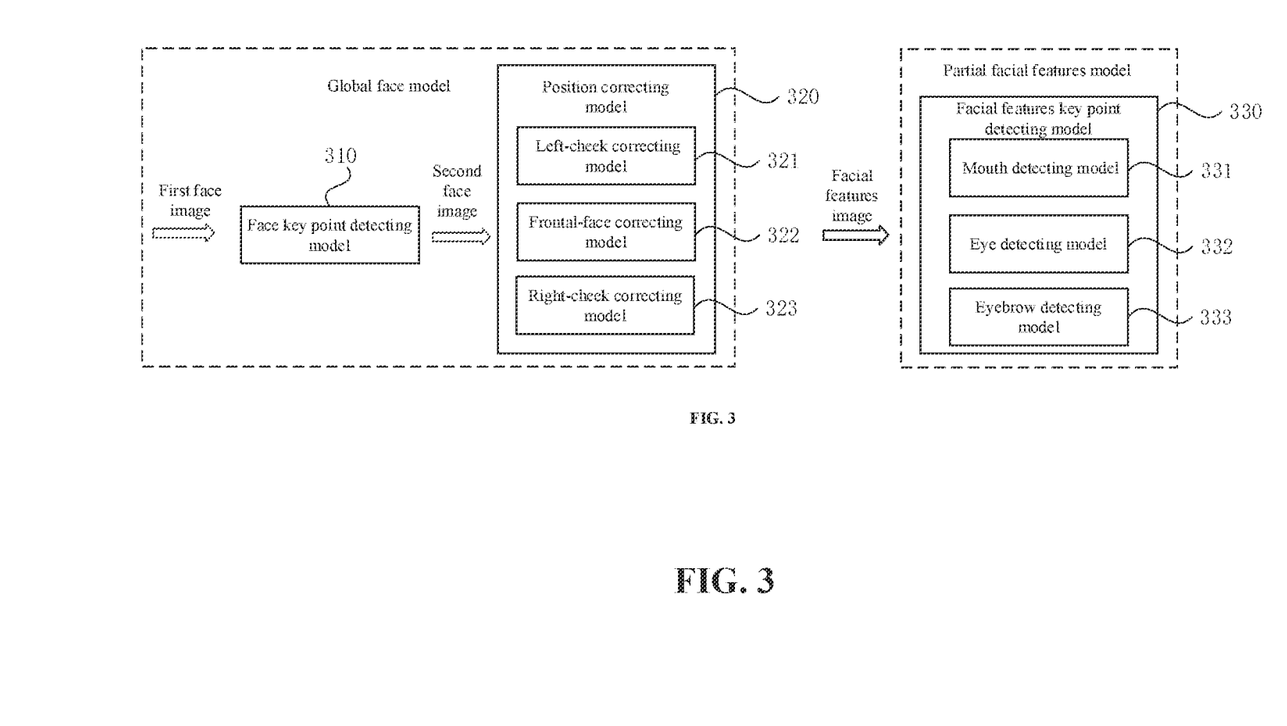
FIG. 3 is a schematic structural diagram of a cascade network according to an embodiment of the present disclosure.

As shown in FIG. 3, a global face model and a partial facial features model may be included.

The global face model includes a face key point detecting model 310 and a position correcting model 320, and the partial facial features model includes a facial features key point detecting model 330.

The face key point detecting model 310, the position correcting model 320 and the facial features key point detecting model 330 constitute a three-layer cascade network.

In S2020, a first face image containing the face is extracted from the image data.

In practice, a face detector is utilized to find the face in the image data, to generate a face detecting box, to intercept the image data in the face detecting box, and to use the intercepted image data as the first face image to eliminate lots of background noise.

Because there may be some deviations when the face detecting box locates different faces, it is usually necessary to intercept the first face image by extending to the periphery at certain proportions based on the face detecting box so as to ensure that the face may be completely intercepted.

In S2030, the first face image is input into a preset face key point detecting model to obtain a first face key point of the face that is output by the face key point detecting model.

As shown in FIG. 3, the face key point detecting model 310 is a first-layer network, the first face image is input into the face key point detecting model 310 to be processed, and the first face key point may be output.

The face key point detecting model 310 may use an end-to-end convolutional neural network model for the purpose of preliminarily acquiring the first face key points such as face contours and facial features contours, and the position of the first face key point may be rough. In view of the follow-up network correction, the face key point detecting model may be designed to be relatively small to guarantee the speed in detecting the first face key point.

The first face image is scaled to a fixed size and then input into the face key point detecting model 310 for a rough positioning so as to acquire a rough first face key point. For example, as shown in FIG. 4, the first face image 41 (the box portion) is cut out from one frame of image data, scaled to 70*70, and input into the face key point detecting model for processing, and the output is the first face key point 42 (the point portion) with 212 dimensions.

Figure 4:
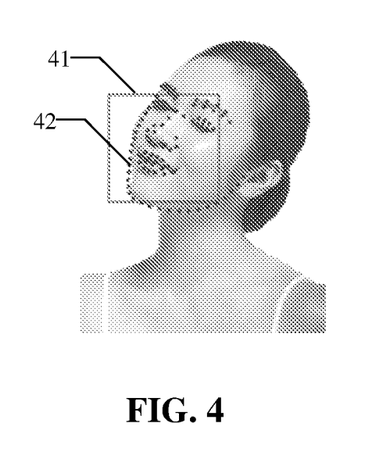
FIG. 4 is an example diagram showing detection of a face key point according to an embodiment of the present disclosure.

It can be seen from FIG. 4 that a prediction result of the first-layer network (the first face key point) is relatively rough, neither an outer contour nor facial features are accurate enough, and the input face detecting box may not cover all the contents of the face, and a signal-to-noise ratio is large.

In S2040, a posture angle of the face is calculated using the first face key point.

Based on the first face key point, the posture angle of the face may be regressed by a simple posture angle estimating model, and the posture angle includes a pitch angle, a roll angle and a yaw angle.

The posture angle estimating model is relatively simple, such as a two-layer fully-connected network, which takes almost negligible time.

For example, as shown in FIG. 4, input of the posture angle estimating model is a 212-dimensional first face key point, and output is a 3-dimensional posture angle.

In S2050, angle correction is performed on the face based on the posture angle.

In the present embodiment, in order to facilitate the calculation, face sample data of the position correcting model may be trained to uniformly adjust a certain posture angle to a designated position, such as a horizontal position.

In the present embodiment, for the image data containing the face, the image data may be adjusted, so that the angle of the face in the image data may be corrected, and the posture angle of the face in the image data may be adjusted to a specified angle value. Thus, correction of the first face key point may be simplified.

In an embodiment, the posture angle includes a roll angle.

In this embodiment, a face base point may be selected from the first face key point, such as the first face key point at the tip of a nose.

A position of the face base point is maintained and the image data is adjusted until the roll angle reaches a specified angle value (e.g., 0).

In S2060, a face type of the face is identified based on the posture angle of the face.

The posture angle of the face may express an orientation of face, so as to identify the face type of face.

In an embodiment, the posture angle includes a yaw angle.

In this embodiment, an angle range to which the yaw angle belongs may be determined in a preset mapping table, and a face type corresponding to the angle range to which the yaw angle belongs is set as the face type of the face.

In this embodiment, a mapping relationship between the angle range and the face type is recorded in the mapping table.

In one example, the mapping table records are shown in the following table:

| Angle Range | Face Type |
| --- | --- |
| YAW ≤ −25° | Left cheek |
| −25° < YAW < 25° | Frontal face |
| 25° ≤ YAW | Right cheek |

In this example, the face type includes the left cheek, the frontal face and the right cheek. If the yaw angle of the face is less than or equal to −25°, the face may be considered as the left cheek; if the yaw angle of the face is greater than −25° and less than 25°, the face may be considered as the frontal face; and if the yaw angle of the face is greater than or equal to 25°, the face may be considered as the right cheek.

For example, as shown in FIG. 4, the yaw angle of the face is −60° and is less than or equal to −25°, and the face is considered as the left cheek.

The above-mentioned face type and the identifying mode thereof merely serve as examples. During implementation of the embodiments, other face types and identifying modes thereof may be set according to actual conditions, for example, the face types are divided into a heavy left cheek (yaw≤−60°), a light left cheek (−60°<YAW≤30°), a frontal face (−30°<YAW<30°), a light right cheek (30°≤YAW<60°) and a heavy right cheek (60°≤YAW), and the face type of the face is identified by both the pitch and the roll, etc. Neither the face type nor the identifying mode thereof is limited in the embodiments of the present disclosure. In S2070, a position correcting model corresponding to the face type is searched.

In S2080, a second face image containing the face is extracted from the image data based on the first face key point.

As shown in FIG. 3, the position correcting model 320 belongs to a second-layer network, a second face image is input into the position correcting model 320 for processing and the first face key point subjected to the position correction may be output.

For each face type, the face sample data (including the face key point) of the face type may be used to train the position correcting model corresponding to the face type. In an embodiment, the position correcting model may be an end-to-end convolutional neural network model.

For example, as shown in FIG. 3, assuming that the face type includes the left cheek, the frontal face and the right cheek, a left-cheek correcting model 321, a frontal-face correcting model 322 and a right-cheek correcting model 323 may be trained accordingly. In an embodiment, the left-cheek correcting model 321 is configured to perform position correction on the second face image belonging to the left cheek, the frontal-face correcting model 322 is configured to perform position correction on the second face image belonging to the frontal face, and the right-cheek correcting model 323 is configured to perform position correction on the second face image belonging to the right cheek.

In embodiments of the present disclosure, if the face type of the face in the image data is identified, in an aspect, the position correcting model corresponding to the face type is searched, and in another aspect, a face surrounding box, such as a minimum rectangular box containing all the first face key points, may be acquired based on the first face key point. Compared with the face detecting box, the face surrounding box may locate the face more accurately.

Since one branch network is operated for each frame of the second face image, the elapsed time will not be prolonged. On the contrary, by distinguishing the face type, the position correction will become simpler, and an excellent effect may be achieved only by one small network.

Because there may be some deviations when the face surrounding box locates different faces, it is usually necessary to intercept the second face image by extending to the periphery at certain proportions based on the face surrounding box so as to ensure that the face may be completely intercepted. Therefore, background noise may be reduced, and correction of the first face key point may be simplified.

In S2090, the second face image is input into the position correcting model to perform position correction on the first face key point.

For the rough positioning of the face key point detecting model, the position correcting models of different face types belong to a plurality of different branches, so that rough positioning may be corrected.

As shown in FIG. 3, the second face image is scaled to a fixed size, and is input to the position correcting model 320 (e.g., input to a correcting model matching the face type, that is, the left-cheek correcting model 321, the frontal-face correcting model 322 and the right-cheek correcting model 323) to correct the first face key points of the different face types.

The second face images input at the same time have certain class features or commonness, and for example, they are both the left cheek. Under the impact of face angle correction, screenshot of the second face image data and other factors, the correction of the first face key point may achieve excellent results by using a very light network, i.e., the position correcting model may be designed relatively small, and thus the speed in correcting the first face key point is guaranteed.

Because the first face key points corresponding to the facial features are usually concentrated and have strong local features, the signal-to-noise ratio is relatively large if only locating the whole face area, there is correction room for the first face key points corresponding to the facial features.

In one example, the first face key point includes at least one of the followings.

1. Mouth Key Point

A mouth key point is a first key point corresponding to a mouth.

For the mouth key point, the position correcting model may connect the mouth key points at corners of the mouth to acquire a first base line.

A mouth base point (e.g., a midpoint) is selected on the first base line.

A position of the mouth base point is maintained and the mouth key point is adjusted until the first base line is located in a designated first position (e.g., a horizontal position).

2. Eyebrow Key Point

An eyebrow key point is a first key point corresponding to an eyebrow.

For the eyebrow key point, the position correcting model may connect the eyebrow key points at corners of eyebrows to acquire a second base line.

An eyebrow base point (e.g., a midpoint) is selected on the second base line.

A position of the eyebrow base point is maintained and the eyebrow key point is adjusted until the second base line is located in a designated second position (e.g., a horizontal position).

In order to improve the accuracy in correcting the eyebrow key points, an eyebrow key point of a left eyebrow and an eyebrow key point of a right eyebrow may be corrected separately.

3. Eye Key Point

An eye key point is a first key point corresponding to an eye.

For the eye key points, the position correcting model may connect the eye key points located at corners of the eyes to acquire a third base line.

An eye base point (e.g., a midpoint) is selected on the third base line.

A position of the eye base point is maintained and the eye key point is adjusted until the third base line is located in a designated third position (e.g., a horizontal position).

In order to improve the accuracy in correcting the eye key points, an eye key point of a left eye and an eye key point of a right eye may be corrected separately.

The above correction modes are merely examples. During implementation of the embodiments, other correction modes may be set according to actual conditions which are not limited in the embodiments of the present disclosure.

Figure 5:
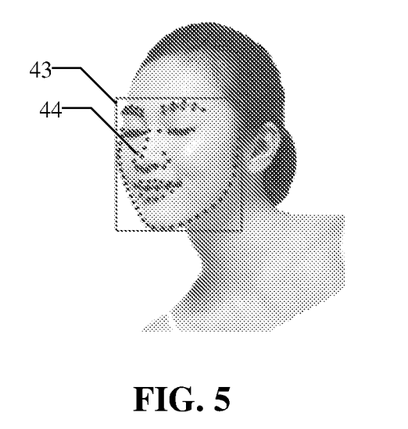
FIG. 5 is another example diagram showing detection of a face key point according an embodiment of the present disclosure.

For example, as shown in FIG. 5, the second face image 43 (the box portion) is intercepted from the image data subjected to the angle correction, scaled to 70*70 and input into the position correcting model for processing, and the output is the first face key point 44 (the point portion) with 212 dimensions.

According to FIG. 5, a prediction result of the second-layer network (the first face key point subjected to the position correction or the first face key point after the position correction) may be seen, that is, an input face surrounding box may cover most of the face, and at the same time, the background noise may be reduced as much as possible. Compared with the prediction result of the first-layer network, this prediction result is more accurate, the outer contour fits better, and the facial features are also corrected to some extent.

In S2100, a facial features image containing facial features is extracted from the image data based on the first face key point subjected to the position correction.

A facial features surrounding box may be acquired based on the corrected first face key point. For example, all the corrected first face key points corresponding to one of the facial features are contained in a minimum rectangular box. The facial features surrounding boxes may accurately locate the facial features.

Because there may be some deviations when the facial features surrounding box locates different facial features of the face, it is usually necessary to intercept face images of the facial features by extending to the periphery at certain proportions based on the facial features surrounding box so as to ensure that the facial features may be completely intercepted. Therefore, the background noise may be reduced, and positioning of the second face key point may be simplified.

In S2110, a facial features key point detecting model corresponding to the facial features image is searched.

In S2120, the facial features image is input into the facial features key point detecting model to obtain a second face key point of the face which is output by the facial features key point detecting model.

As shown in FIG. 3, the facial features key point detecting model 330 belongs to a third-layer network, the facial features image is input into the facial features key point detecting model 330 for processing, and the second face key point may be output.

For the facial features, such as eyes, mouth, eyebrows and nose, facial features sample data corresponding to the facial features may be adopted to train the facial features key point detecting model corresponding to the facial features. In an embodiment, the facial features key point detecting model may be an end-to-end convolutional neural network model.

The facial features image is scaled to a fixed size and input to the corresponding facial features key point detecting model to detect the second face key points of the different facial features.

Because each facial feature has a small range of local area and the input facial features image is small, the output dimension is set by the number of key points of the different facial features.

Due to the small input of the facial features key point detecting model, the calculation amount is relatively small, and a large number of local location errors under special expressions, such as eye closing, mouth opening and eyebrow raising, may be corrected.

The facial features corrected by the position correcting model may be in one-to-one correspondence with the facial features key point detecting models.

For example, as shown in FIG. 3, the facial features key point detecting model 330 includes a mouth detecting model 331, an eye detecting model 332 and an eyebrow detecting model 333. After the position correcting model 320 corrects the first face key points of the mouth, the eyes and the eyebrows, the facial features images such as a mouth image, an eye image and an eyebrow image may be correspondingly extracted based on the corrected first face key points.

The mouth image is input into the mouth detecting model 331 for processing and the second face key point of the mouth is detected.

The eye image is input into the eye detecting model 332 for processing and the second face key point of the eyes is detected.

The eyebrow image is input into the eyebrow detecting model 333 for processing and the second face key point of the eyebrows is detected.

Figure 6:
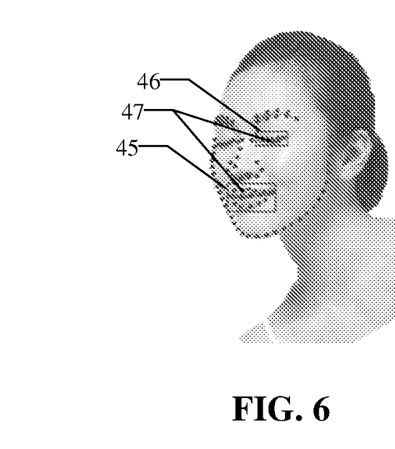
FIG. 6 is a yet another example diagram showing detection of a face key point according to an embodiment of the present disclosure.

For example, as shown in FIG. 6, the mouth image 45 and the eye image 46 (the box portion) are cut out from the image data subjected to the position correction and scaled to 30*30, the mouth image 45 is input into the mouth detecting model to detect the second face key point, and the eye image 46 is input into the eye detecting model to detect the second face key point 47 (the point portion).

According to FIG. 6, a prediction result of the third-layer network (the second face key point) can be seen, that is, an input facial features surrounding box may cover most of the facial features and the background noise may be reduced as much as possible. Compared with the prediction result of the second-layer network, this prediction result is more accurate, the facial features are partially corrected, and for example, the second key point of the eyes may describe the degree of eye closure more accurately.

Figure 7:
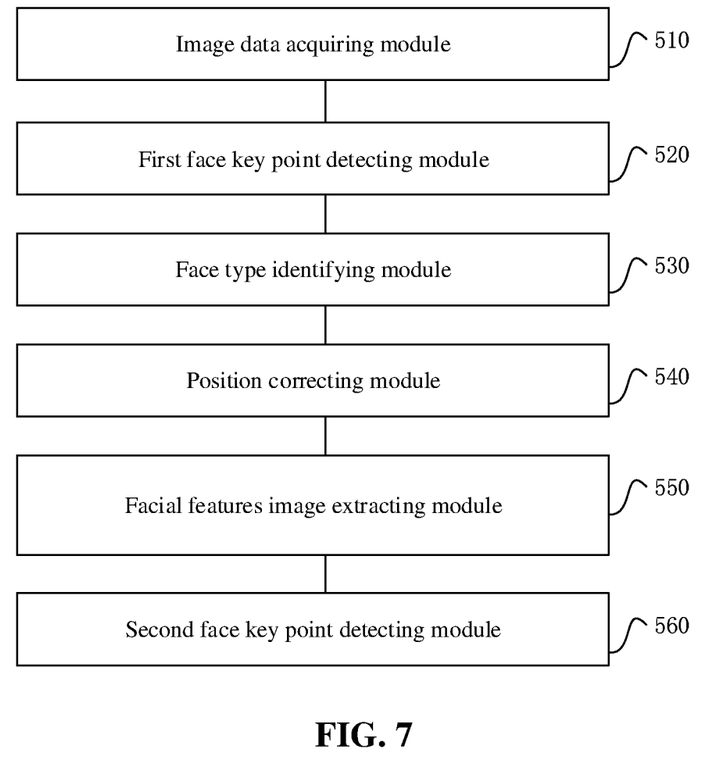
FIG. 7 is a schematic structural diagram of an apparatus for detecting a face key point according to an embodiment of the present disclosure.

Referring to FIG. 7, a schematic structural diagram of an apparatus for detecting a face key point according to embodiment 3 of the present disclosure is shown. The apparatus may include the following modules: an image data acquiring module 510 configured to acquire image data containing a face; a first face key point detecting module 520 configured to detect a first face key point of the face in the image data; a face type identifying module 530 configured to identify a face type of the face according to the first face key point; a position correcting module 540 configured to perform position correction on the first face key point with reference to the face type; a facial features image extracting module 550 configured to extract a facial features image containing facial features from the image data based on the first face key point subjected to the position correction; and a second face key point detecting module 560 configured to detect a second face key point of the face in the facial features image.

In an embodiment of the present disclosure, the first face key point detecting module 520 includes a first face image extracting sub-module configured to extract a first face image containing the face from the image data; and a face key point detecting model invoking sub-module configured to input the first face image into a preset face key point detecting model to obtain a first face key point of the face, which is output by the face key point detecting model.

In some embodiments of the present disclosure, the face type identifying module 530 includes a posture angle calculating sub-module configured to calculate a posture angle of the face using the first face key point; and a posture angle identifying sub-module configured to identify a face type of the face based on the posture angle of the face.

In an example of the present embodiment, the posture angle includes a yaw angle, and the posture angle identifying sub-module includes an angle range determining unit configured to determine an angle range to which the yaw angle belongs in a preset mapping table, and a face type setting unit configured to set a face type corresponding to the angle range as the face type of the face. A mapping relationship between the angle range and the face type is recorded in the mapping table.

In an embodiment of the present disclosure, the face type identifying module 530 further includes an angle correcting sub-module configured to perform angle correction on the face based on the posture angle before the face type of the face is identified based on the posture angle of the face.

In an example of the present embodiment, the posture angle includes a roll angle, and the angle correcting sub-module includes a face base point selecting unit configured to select a face base point from the first face key point, and an image data adjusting unit configured to maintain the position of the face base point and to adjust the image data until the roll angle reaches a specified angle value.

In an embodiment of the present disclosure, the position collecting module 540 includes a correcting model searching sub-module configured to search for a position correcting model corresponding to the face type, a second face image extracting sub-module configured to extract a second face image containing the face from the image data based on the first face key point, and a position correcting model invoking sub-module configured to input the second face image into the position correcting model to perform position correction on the first face key point.

In an example of the present disclosure, the first face key point includes at least one of a mouth key point, an eyebrow key point and an eye key point. The position correcting model invoking sub-module includes a mouth key point connecting unit configured to connect the mouth key points at corners of a mouth to acquire a first base line, a mouth base point selecting unit configured to select a mouth base point on the first base line, and a mouth key point adjusting unit configured to maintain a position of the mouth base point and to adjust the mouth key point until the first base line is located in a designated first position; and/or an eyebrow key point connecting unit configured to connect the eyebrow key points at corners of eyebrows to acquire a second base line, an eyebrow base point selecting unit configured to select an eyebrow base point on the second base line, and an eyebrow key point adjusting unit configured to maintain the position of the eyebrow base point and to adjust the eyebrow key point until the second base line is located in a designated second position; and/or an eye key point connecting unit configured to connect the eye key points at corners of eyes to acquire a third base line, an eye base point selecting unit configured to select an eye base point on the third base line, and an eye key point adjusting unit configured to maintain the position of the eye base point and to adjust the eye key point until the third base line is located in a designated third position.

In an embodiment of the present disclosure, the second face key point detecting module 560 includes a facial features key point detecting model searching sub-module configured to search for a facial features key point detecting model corresponding to the facial features image, and a facial features key point detecting model invoking sub-module configured to input the facial features image into the facial features key point detecting model to obtain a second face key point of the face, which is output by the facial features key point detecting model.

The apparatus for detecting the face key point provided by the present embodiment may execute the method for detecting the face key point as provided by any embodiment of the present disclosure, and has corresponding functional modules and beneficial effects of the executed methods.

Figure 8:
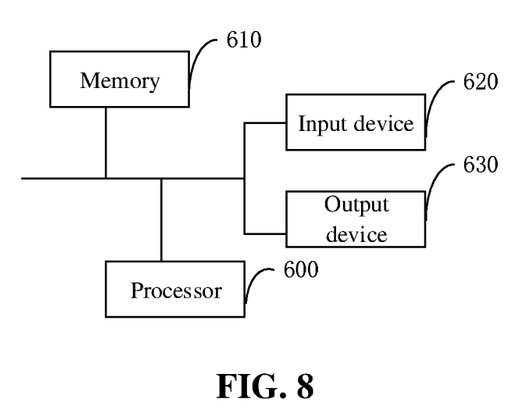
FIG. 8 is a schematic structural diagram of a computer device according to an embodiment of the present disclosure.

Referring to FIG. 8, a schematic structural diagram of a computer device according to embodiment 4 of the present disclosure is shown. As shown in FIG. 8, the computer device includes a processor 600, a memory 610, an input device 620 and an output device 630. There may be one or more than one processors 600 in the computer device, and one processor 600 is taken as an example in FIG. 8. The processor 600, the memory 610, the input device 620, and the output device 630 in the computer device may be connected by a bus or other means, and connection by a bus is taken as an example in FIG. 8.

The memory 610, as a computer-readable storage medium, may be configured to store software programs, computer-executable programs and modules, such as program instructions/modules (e.g., the image data acquiring module 510, the first face key point detecting module 520, the face type identifying module 530, the position correcting module 540, the facial features image extracting module 550 and the second face key point detecting module 560) corresponding to the methods for detecting the face key point in the embodiments of the present disclosure. The processor 600 executes at least one functional application and data processing of the computer device by running the software programs, instructions and modules stored in the memory 610, i.e., realizes the methods for detecting the face key point.

The memory 610 may mainly include a program storage area and a data storage area. In the memory 610, the program storage area may store an operating system and an application required by at least one function, and the data storage area may store data built based on the use of a terminal. Moreover, the memory 610 may include a high-speed random access memory and may further include a nonvolatile memory, such as at least one disk memory, a flash memory or other nonvolatile solid-state memories. In some examples, the memory 610 may include memories remotely located relative to the processor 600, and these remote memories may be connected to the computer device via a network. Examples of the network include, but not limited to, the Internet, intranets, local area networks, mobile radio communications and combinations thereof.

The input unit 620 may be configured to receive input digital or character information and to generate key signal inputs related to user settings and functional control of the computer device. The output device 630 may include such display devices as a display screen.

According to embodiment 5 of the present disclosure, a storage medium containing instructions executable by a computer is further provided. The instructions executable by the computer, when executed by a processor of the computer, causes the processor to implement a method for detecting a face key point. The method includes: acquiring image data containing a face; detecting a first face key point of the face in the image data; identifying a face type of the face according to the first face key point; performing position correction on the first face key point with reference to the face type; extracting a facial features image containing facial features from the image data based on the first face key point subjected to the position correction; and detecting a second face key point of the face in the facial features image.

According to an embodiment of the present disclosure, a storage medium includes instructions executable by a computer. Not limited to the above method operations, the instructions executable by the computer may also perform related operations in the method for detecting the face key point as provided by any embodiment of the present disclosure.

From the above descriptions of the embodiments, those skilled in the art can learn about that the present disclosure may be implemented by means of software and general hardware, and may also be realized by hardware. The technical solutions of the present disclosure may be embodied in the form of computer software products that may be stored in a computer-readable storage medium, such as a floppy disk, a read-only memory (ROM), a random access memory (RAM), a FLASH memory, a hard disk or an optical disk of a computer, including a plurality of instructions to enable a computer device (which may be a personal computer, a server, a network device, or the like) to perform the method described in any embodiment of the present disclosure.

In the embodiments of the apparatus for detecting the face key point, the included units and modules are only divided according to the functional logic but are not limited to the above division as long as the corresponding functions can be realized. In addition, the name of each functional unit is only for the convenience of distinguishing, and is not used to limit the scope of protection of the present disclosure.

What is claimed is:

1. A method for detecting a face key point, comprising:
acquiring image data containing a face;
invoking a face key point detecting model and detecting a first face key point of the face in the image data;
calculating a posture angle of the face using the first face key point;
identifying a face type of the face based on the posture angle of the face;
searching for a position correcting model corresponding to the face type;
extracting a second face image containing the face from the image data based on the first face key point;
inputting the second face image into the position correcting model to perform position correction on the first face key point;
extracting a facial features image containing facial features from the image data based on a first face key point subjected to the position correction; and
invoking a facial features key point detecting model corresponding to the facial features image and detecting a second face key point of the face in the facial features image.

2. The method according to claim 1, wherein invoking a face key point detecting model and detecting the first face key point of the face in the image data comprises:
extracting a first face image containing the face from the image data; and
inputting the first face image into a preset face key point detecting model to output a first face key point of the face.

3. The method according to claim 1, wherein the posture angle comprises a yaw angle, and identifying the face type of the face based on the posture angle of the face comprises:
determining an angle range to which the yaw angle belongs in a preset mapping table; and
setting a face type corresponding to the angle range as the face type of the face;
wherein a mapping relationship between the angle range and the face type is recorded in the mapping table.

4. The method according to claim 1, wherein before identifying the face type of the face based on the posture angle of the face, the method further comprises:
performing angle correction on the face based on the posture angle.

5. The method according to claim 3, wherein the posture angle comprises a roll angle; and
performing the angle correction on the face based on the posture angle comprises:
selecting a face base point from the first face key point; and
maintaining a position of the face base point and adjusting the image data until the roll angle reaches a specified angle value.

6. The method according to claim 1, wherein the first face key point comprises at least one of a mouth key point, an eyebrow key point and an eye key point; and
inputting the second face image into the position correcting model to perform the position correction on the first face key point comprises:
connecting mouth key points at corners of a mouth to acquire a first base line; selecting a mouth base point on the first base line, and maintaining a position of the mouth base point and adjusting the mouth key point until the first base line is located in a designated first position; and/or,
connecting eyebrow key points at corners of eyebrows to acquire a second base line; selecting an eyebrow base point on the second base line, and maintaining a position of the eyebrow base point and adjusting the eyebrow key point until the second base line is located in a designated second position; and/or
connecting eye key points at corners of eyes to acquire a third base line; selecting an eye base point on the third base line, and maintaining a position of the eye base point and adjusting the eye key point until the third base line is located in a designated third position.

7. The method according to claim 1, wherein invoking a facial features key point detecting model corresponding to the facial features image and detecting the second face key point of the face in the facial features image comprises:
searching for the facial features key point detecting model corresponding to the facial features image; and
inputting the facial features image into the facial features key point detecting model to output a second face key point of the face.

8. A non-transitory computer-readable storage medium storing a computer program, wherein the computer program, when executed by a processor, causes the processor to perform the method for detecting the face key point according to claim 1.

9. An apparatus for detecting a face key point, comprising:
an image data acquiring module configured to acquire image data containing a face;
a first face key point detecting module configured to detect a first face key point of the face in the image data;
a face type identifying module configured to identify a face type of the face according to the first face key point;
a position correcting module configured to perform position correction on the first face key point with reference to the face type;
a facial features image extracting module configured to extract a facial features image containing facial features from the image data based on a first face key point subjected to the position correction; and
a second face key point detecting module configured to detect a second face key point of the face in the facial features image;
wherein the position correcting module comprises:
a correcting model searching sub-module configured to search for a position correcting model corresponding to the face type;
a second face image extracting sub-module configured to extract a second face image containing the face from the image data based on the first face key point; and
a position correcting model invoking sub-module configured to input the second face image into the position correcting model to perform position correction on the first face key point; and
wherein the face type identifying module comprises:
a posture angle calculating sub-module configured to calculate a posture angle of the face using the first face key point; and
a posture angle identifying sub-module configured to identify a face type of the face based on the posture angle of the face.

10. A computer device, comprising a memory, a processor and a computer program stored on the memory and operable on the processor, wherein the processor is configured to:
- acquire image data containing a face;
- invoke a face key point detecting model and detect a first face key point of the face in the image data;
- calculate a posture angle of the face using the first face key point;
- identify the face type of the face based on the posture angle of the face;
- search for a position correcting model corresponding to the face type;
- extract a second face image containing the face from the image data based on the first face key point;
- input the second face image into the position correcting model to perform position correction on the first face key point;
- extract a facial features image containing facial features from the image data based on a first face key point subjected to the position correction; and
- invoke a facial features key point detecting model corresponding to the facial features image and detect a second face key point of the face in the facial features image.

11. The computer device according to claim 10, wherein the processor is further configured to:
- extract a first face image containing the face from the image data; and
- input the first face image into a preset face key point detecting model to output a first face key point of the face.

12. The computer device according to claim 10, wherein the posture angle comprises a yaw angle and the processor is further configured to:
- determine an angle range to which the yaw angle belongs in a preset mapping table; and
- set a face type corresponding to the angle range as the face type of the face; and
- wherein a mapping relationship between the angle range and the face type is recorded in the mapping table.

13. The computer device according to claim 10, wherein the processor is further configured to perform angle correction on the face based on the posture angle.

14. The computer device according to claim 13, wherein the posture angle comprises a roll angle and the processor is further configured to:
- select a face base point from the first face key point; and
- maintain a position of the face base point and adjusting the image data until the roll angle reaches a specified angle value.

15. The computer device according to claim 10, wherein the first face key point comprises at least one of a mouth key point, an eyebrow key point and an eye key point, and that the processor is further configured to input the second face image into the position correcting model to perform position correction on the first face key point comprises:
- connect mouth key points at corners of a mouth to acquire a first base line; select a mouth base point on the first base line, and maintain a position of the mouth base point and adjust the mouth key point until the first base line is located in a designated first position;
and/or,
- connect eyebrow key points at corners of eyebrows to acquire a second base line; select an eyebrow base point on the second base line, and maintain a position of the eyebrow base point and adjust the eyebrow key point until the second base line is located in a designated second position;
and/or,
- connect eye key points at corners of eyes to acquire a third base line; select an eye base point on the third base line, and maintain a position of the eye base point and adjust the eye key point until the third base line is located in a designated third position.

16. The computer device according to claim 10, wherein the processor is further configured to:
- search for the facial features key point detecting model corresponding to the facial features image; and
- input the facial features image into the facial features key point detecting model to output a second face key point of the face.

* * * * *